United States Patent
Uehata et al.

(10) Patent No.: US 11,807,086 B2
(45) Date of Patent: Nov. 7, 2023

(54) VEHICLE AND BACK DOOR

(71) Applicants: TOYOTA JIDOSHA KABUSHIKI KAISHA, Toyota (JP); SUBARU CORPORATION, Tokyo (JP)

(72) Inventors: Masami Uehata, Toyota (JP); Hirofumi Sakaue, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/704,272

(22) Filed: Mar. 25, 2022

(65) Prior Publication Data
US 2022/0305889 A1 Sep. 29, 2022

(30) Foreign Application Priority Data
Mar. 29, 2021 (JP) ................. 2021-055930

(51) Int. Cl.
*B60J 5/10* (2006.01)
*B60J 1/18* (2006.01)

(52) U.S. Cl.
CPC ........... *B60J 5/107* (2013.01); *B60J 1/18* (2013.01)

(58) Field of Classification Search
CPC ... B60J 5/107; B60J 1/18; B60J 5/0452; B60J 5/0454
USPC ............... 296/56, 106, 187.11, 146.8, 146.6
See application file for complete search history.

(56) References Cited

U.S. PATENT DOCUMENTS

| | | | | |
|---|---|---|---|---|
| 4,822,098 A * | 4/1989 | Vogt | ........................ | B60J 5/107 296/76 |
| 6,003,931 A * | 12/1999 | Dancasius | ................ | B60J 5/101 49/340 |
| 7,490,891 B2 * | 2/2009 | Terakawa | ............. | B62D 35/007 296/180.1 |
| 8,746,777 B2 * | 6/2014 | Iwano | .................... | E05F 1/1091 296/146.8 |
| 8,899,658 B1 * | 12/2014 | Gangal | ..................... | B60J 5/107 296/56 |
| 2011/0156437 A1 | 6/2011 | Kishino | | |
| 2016/0031299 A1 * | 2/2016 | Ikeda | ....................... | B60J 5/107 49/502 |
| 2016/0347155 A1 * | 12/2016 | Kuntze | .................... | B60J 5/101 |

(Continued)

FOREIGN PATENT DOCUMENTS

| | | | | |
|---|---|---|---|---|
| FR | 2763113 A1 * | 11/1998 | ......... | B29C 44/1228 |
| JP | 2007-008234 A | 1/2007 | | |

(Continued)

OTHER PUBLICATIONS

Translation of FR 2763113 A1 (Year: 1998).*

*Primary Examiner* — Amy R Weisberg
*Assistant Examiner* — Wenwei Zhuo
(74) *Attorney, Agent, or Firm* — Dinsmore & Shohl LLP

(57) ABSTRACT

A back door attached to a rear of a vehicle body includes an inner panel, an outer panel facing the inner panel, a first reinforcing member laid on an outer side of the vehicle body and fixed to the inner panel together with a hinge, and a second reinforcing member including a porous portion and arranged to fill a first space between the first reinforcing member and the outer panel on an outer side in a width direction of the vehicle body from a hinge support that supports the hinge to overlap at least a part of a glass upper edge of a back window glass.

11 Claims, 5 Drawing Sheets

(56) References Cited

U.S. PATENT DOCUMENTS

| | | | |
|---|---|---|---|
| 2019/0184798 A1* | 6/2019 | Chiba | B62D 27/026 |
| 2019/0184799 A1* | 6/2019 | Kerschbaum | B60J 5/107 |
| 2021/0291907 A1* | 9/2021 | Kosaka | B62D 21/152 |
| 2022/0250452 A1* | 8/2022 | Miyake | B60J 5/101 |
| 2022/0266664 A1* | 8/2022 | Tichy | B29C 45/14631 |
| 2022/0324517 A1* | 10/2022 | Kamimura | B62D 25/087 |

FOREIGN PATENT DOCUMENTS

| | | | |
|---|---|---|---|
| JP | 2007-216870 A | | 8/2007 |
| JP | 2011005912 A | * | 1/2011 |
| JP | 2011-131784 A | | 7/2011 |
| JP | 2017-025209 A | | 2/2017 |
| JP | 2017-132347 A | | 8/2017 |
| JP | 2017-132413 A | | 8/2017 |
| JP | 2017132413 A | * | 8/2017 |
| JP | 2018090069 A | * | 6/2018 |

* cited by examiner

FIG. 1
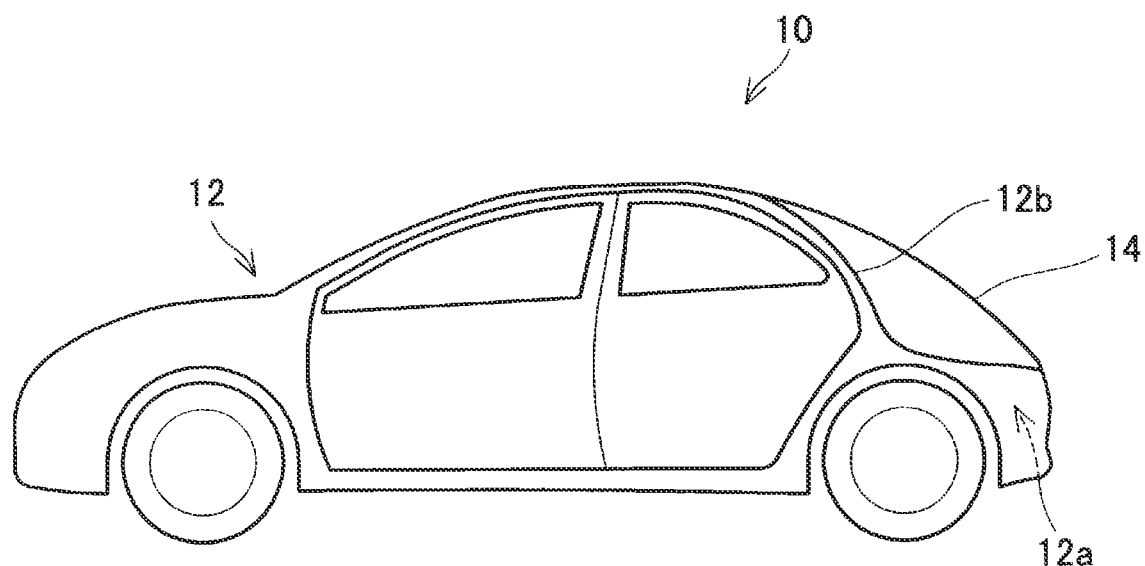
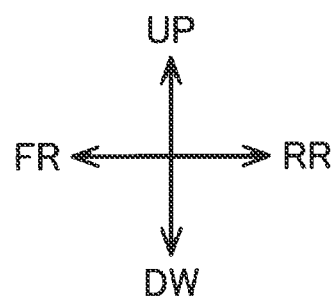

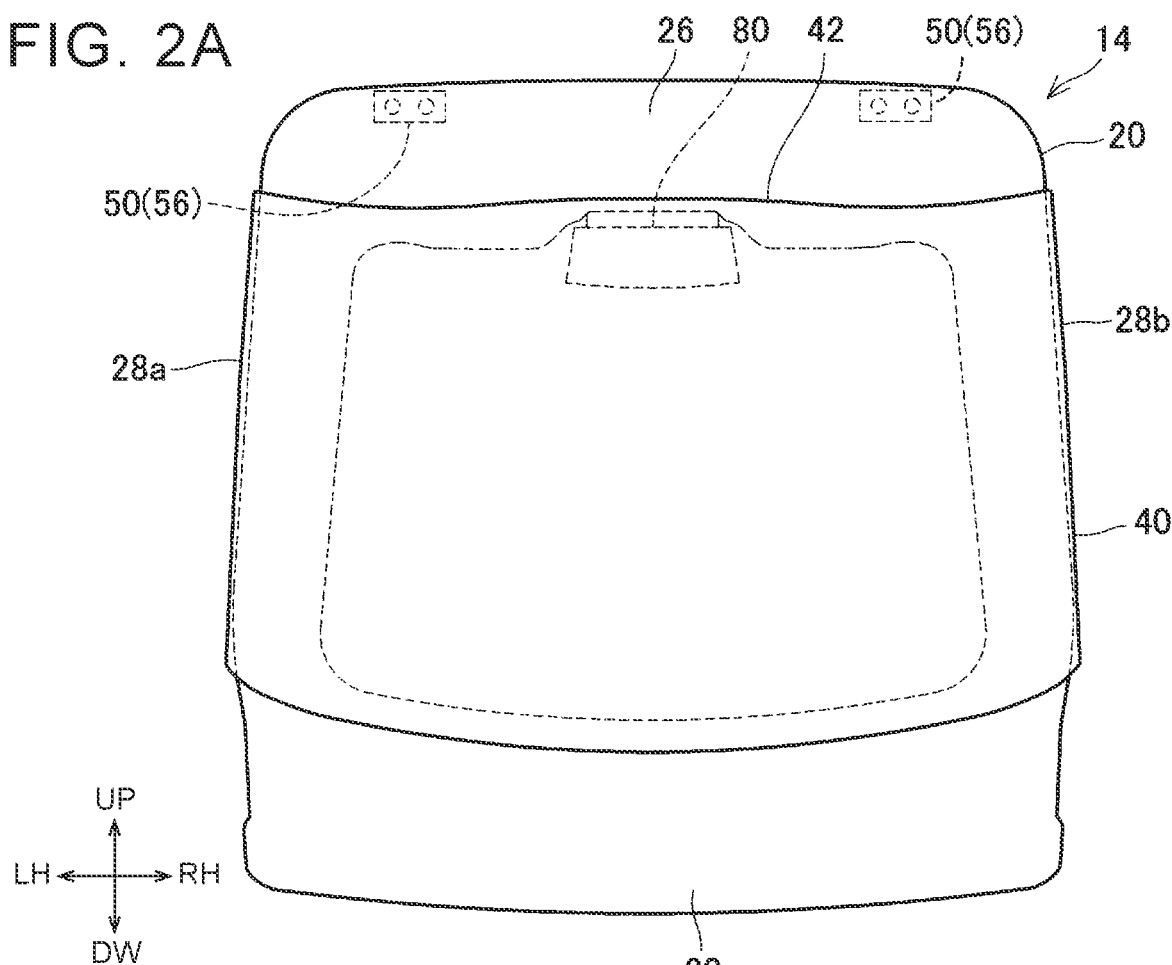
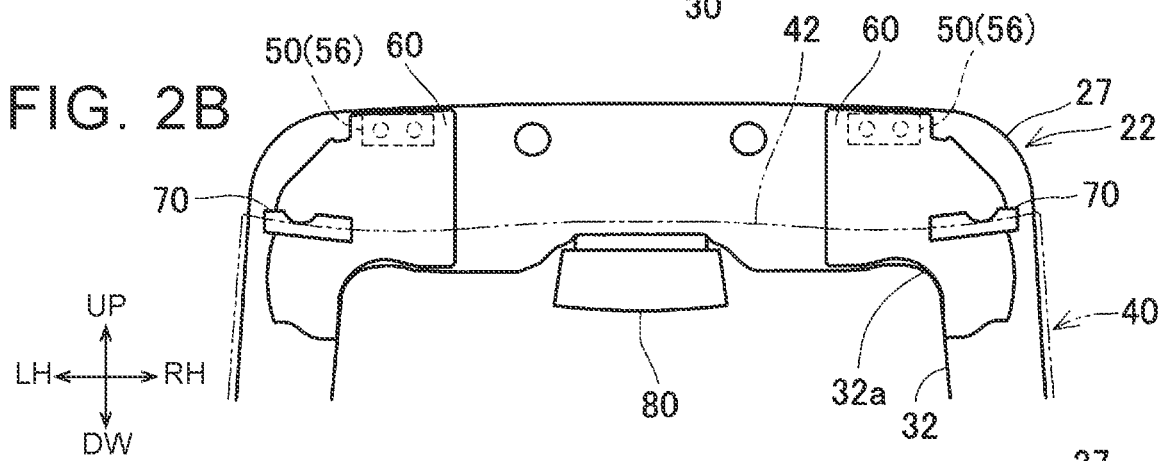
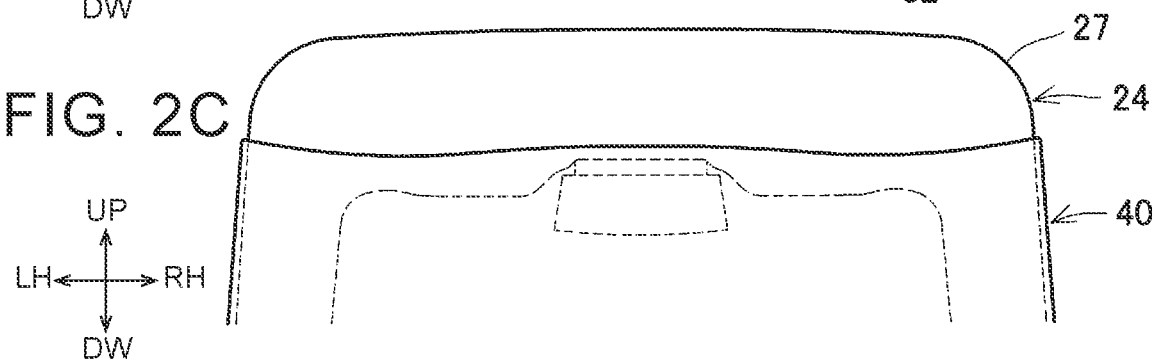

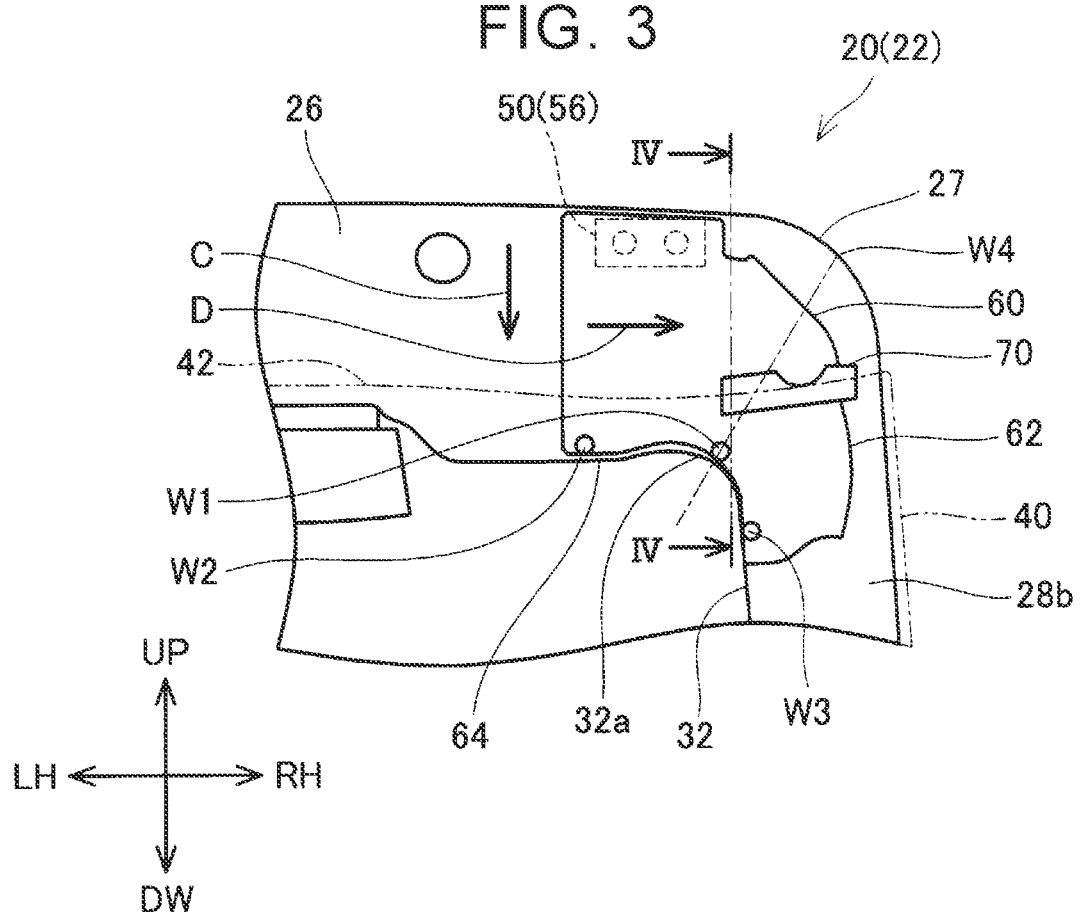
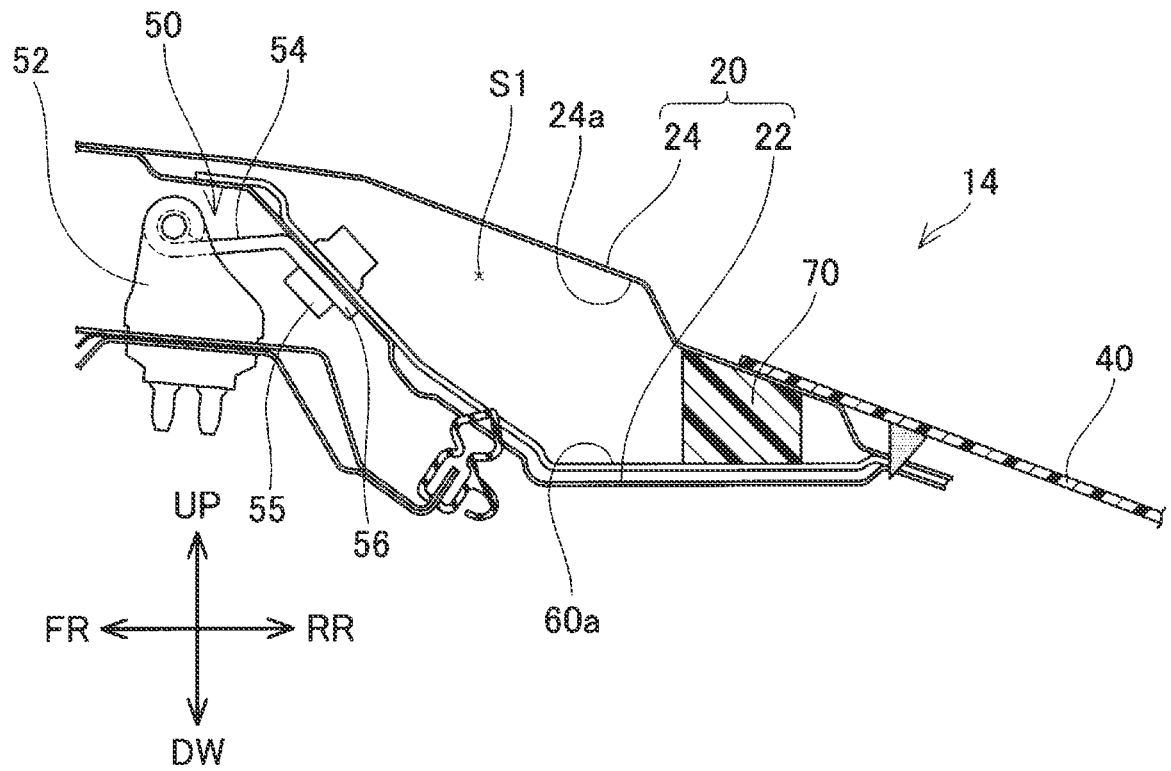

VEHICLE AND BACK DOOR

CROSS-REFERENCE TO RELATED APPLICATION

This application claims priority to Japanese Patent Application No. 2021-055930 filed on Mar. 29, 2021, incorporated herein by reference in its entirety.

BACKGROUND

1. Technical Field

The technology disclosed herein relates to a vehicle and a back door attached to a rear of a vehicle body.

2. Description of Related Art

Japanese Unexamined Patent Application Publication No. 2011-131784 (JP 2011-131784 A) discloses a vehicle. The vehicle includes a vehicle body having an opening at the rear, and a back door that opens and closes the opening. The back door is connected to the vehicle body via a pair of right and left hinges turnable relative to the vehicle body. A load is applied to corners of the back door including the hinges when opening and closing the back door. Therefore, reinforcing members are provided to reinforce the corners (JP 2011-131784 A).

SUMMARY

In this type of backdoor, inclination may be reduced from the viewpoint of reducing aerodynamic resistance and improving design. In such a case, a large back window glass is held as a result. When holding the back window glass having a large mass, further improvement is required in terms of rigidity. The present specification provides a technology for efficiently improving the rigidity of the back door in the vehicle including the back door.

The present specification discloses a vehicle. The vehicle includes a vehicle body and a back door attached to a rear of the vehicle body. The back door includes a back window glass, a door panel, a hinge, a first reinforcing member, and a second reinforcing member. The door panel includes an inner panel arranged on an inner side of the vehicle body, and an outer panel arranged on an outer side of the vehicle body with the back window glass attached to the outer panel. The inner panel and the outer panel each include an upper edge, side edges, and a lower edge to define an open edge where the back window glass is attached. The hinge is fixed to the upper edge of the inner panel and turnably connects the back door to the vehicle body.

The first reinforcing member is laid on the inner panel on the outer side of the vehicle body and fixed to the inner panel together with the hinge. The first reinforcing member has a shape extending downward in a vertical direction of the vehicle body within a range from a hinge support that supports the hinge fixed to the inner panel to a portion overlapping a glass upper edge of the back window glass, and extending outward in a width direction of the vehicle body within a range from the hinge support to the side edge.

The second reinforcing member includes a porous portion and is arranged to fill a first space between the first reinforcing member and the outer panel on an outer side in the width direction of the vehicle body from the hinge support to overlap at least a part of the glass upper edge.

In the back door, the second reinforcing member is arranged to fill the first space between the first reinforcing member and the outer panel on the outer side in the width direction of the vehicle body from the hinge support to overlap at least a part of the glass upper edge. With this structure, it is possible to improve the rigidities of portions corresponding to the door panel on the outer side of the hinge support and the glass upper edge of the back door. The inventors have found that the outer side of the hinge support and the glass upper edge are likely to be start points of bending deformation of the back door. According to the structure described above, the peripheries of the outer side of the hinge support and the glass upper edge are reinforced by the first reinforcing member and the second reinforcing member. Therefore, it is possible to provide a vehicle including a back door that increases the rigidity while suppressing or avoiding the bending deformation at the corner including the outer side of the hinge support and the glass upper edge.

A back door to be attached to a rear of a vehicle body according to another aspect of the present specification includes a door panel, a hinge, a first reinforcing member, and a second reinforcing member. The door panel includes an inner panel arranged on an inner side of the vehicle body, and an outer panel arranged on an outer side of the vehicle body with a back window glass attached to the outer panel. The inner panel and the outer panel each include an upper edge, side edges, and a lower edge to define an open edge where the back window glass is attached. The hinge is fixed to the upper edge of the inner panel and turnably connects the back door to the vehicle body. The first reinforcing member is laid on the inner panel on the outer side of the vehicle body and fixed to the inner panel together with the hinge. The first reinforcing member has a shape extending downward in a vertical direction of the vehicle body within a range from a hinge support that supports the hinge fixed to the inner panel to a portion overlapping a glass upper edge of the back window glass, and extending outward in a width direction of the vehicle body within a range from the hinge support to the side edge. The second reinforcing member includes a porous portion and is arranged to fill a space between the first reinforcing member and the outer panel on an outer side in the width direction of the vehicle body from the hinge support to overlap at least a part of the glass upper edge.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram schematically illustrating a vehicle;

FIG. 2A is an overall diagram of a back door;

FIG. 2B is an exploded view of the vicinity of an upper side of the back door in a vertical direction of a vehicle body;

FIG. 2C is another exploded view of the vicinity of the upper side of the back door in the vertical direction of the vehicle body;

FIG. 3 is an enlarged view of a corner of the back door;

FIG. 4 is a sectional view taken along a line IV-IV in FIG. 3;

DETAILED DESCRIPTION OF EMBODIMENTS

Figure 5A:
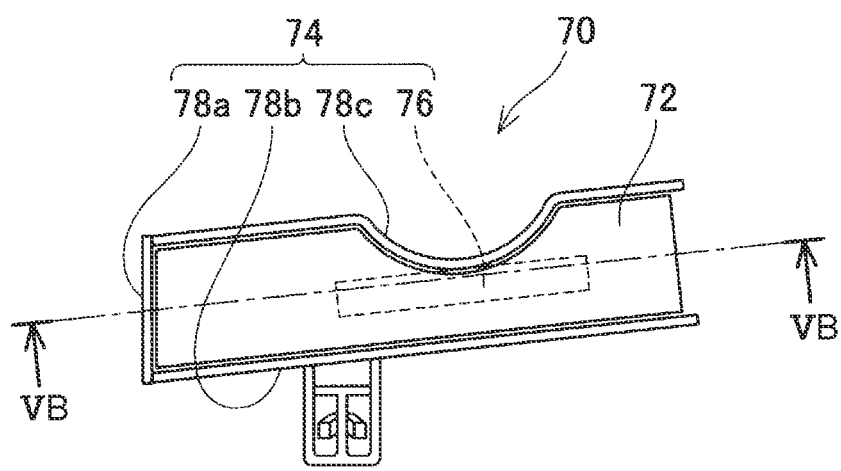
FIG. 5A is an enlarged view of a porous reinforcing member.

One embodiment of the present technology includes a vehicle body and a back door attached to a rear of the vehicle body. The back door includes a back window glass, a door panel, a hinge, a first reinforcing member, and a second reinforcing member. The first reinforcing member and the second reinforcing member are structured as described above. With this structure, the door panel can securely hold even the back window glass having a large area, a large mass, or a gentle inclination. With this structure, it is possible to reduce the sectional area of a closed sectional space of the door panel. For example, the upper edge of the door panel can have a space for attaching a device such as a high-mount stop lamp to the inner side of the vehicle body.

In one embodiment of the present technology, the second reinforcing member may be arranged to intersect a line passing through an inner bending point and an outer bending point of a corner between the upper edge and the side edge of the door panel. With this structure, it is possible to effectively suppress or avoid torsional deformation at the corner of the back door.

In one embodiment of the present technology, the inner panel, the first reinforcing member, and the outer panel may have at least one joint point on an inner edge of a corner between the upper edge and the side edge of the door panel, including an inner bending point of the corner. With this structure, it is possible to effectively suppress or avoid torsional deformation at the corner of the back door.

In one embodiment of the present technology, the second reinforcing member may be arranged to further fill a second space between the inner panel and the outer panel in a vicinity of a joint portion between the inner panel and the outer panel on the outer side in the width direction of the vehicle body to overlap the glass upper edge. With this structure, the second reinforcing member can effectively improve the rigidity of the corner.

In one embodiment of the present technology, the second reinforcing member may be arranged to continuously fill a range from the outer side in the width direction of the vehicle body from the hinge support to a joint portion between the inner panel and the outer panel on the outer side in the width direction of the vehicle body to overlap the glass upper edge. With this structure, the second reinforcing member can improve the rigidity of the corner more effectively.

In one embodiment of the present technology, the second reinforcing member may be joined to a surface of the first reinforcing member on the outer side of the vehicle body and a surface of the outer panel on the inner side of the vehicle body. With this structure, the second reinforcing member can effectively improve the rigidity of the corner.

In one embodiment of the present technology, the second reinforcing member may be joined to inner peripheral surfaces in a vicinity of a joint portion between the inner panel and the outer panel on the outer side in the width direction of the vehicle body. With this structure, the second reinforcing member can effectively improve the rigidity of the corner.

In one embodiment of the present technology, the second reinforcing member may include a non-porous portion in addition to the porous portion to overlap at least the part of the glass upper edge. With this structure, the degree of freedom is improved in terms of adjustment of, for example, the rigidity of the second reinforcing member.

In one embodiment of the present technology, the second reinforcing member may be produced by in-situ foaming and integrated with the door panel. With this structure, the second reinforcing member fills the space by foaming and is joined to the inner surfaces in the space. As a result, the second reinforcing member is integrated with the door panel easily and firmly.

In one embodiment of the present technology, a sectional area of a closed sectional space on the upper edges of the inner panel and the outer panel may be minimum at a central portion in the width direction of the vehicle body. The corner including the upper edge of the door panel and the outer side of the hinge support has a sufficient rigidity by the first and second reinforcing members. For example, a high-mount stop lamp can therefore be attached to the central portion.

One embodiment of the present technology may be a back door to be attached to a rear of a vehicle body. The back door includes a door panel, a hinge, a first reinforcing member, and a second reinforcing member. These elements may have the same forms as those of the corresponding elements in the vehicle described above. According to the structure described above, the glass upper edge on the outer side of the hinge support is reinforced by the first reinforcing member and the second reinforcing member. Therefore, it is possible to provide a back door that can suppress or avoid bending deformation at the side edge of the door panel and the upper edge of the attached back window glass.

In one embodiment of the present technology, the back window glass may be attached to the open edge.

The back door generally includes a pair of right and left hinges, a pair of right and left first reinforcing members, and a pair of right and left second reinforcing members. The embodiment of the present technology may include at least one of the right and left first reinforcing members and the second reinforcing member corresponding to the one first reinforcing member.

A vehicle will be described below as an embodiment of the present technology. A vehicle 10 illustrated in the drawings is an electrified vehicle, and includes a back door 14 at the rear of a vehicle body 12. In the drawing, a direction FR is a forward direction of a fore-and-aft direction of the vehicle body 12, and a direction RR is a rearward direction of the fore-and-aft direction of the vehicle body 12. A direction LH is a leftward direction of a width direction of the vehicle body. A direction RH is a rightward direction of the width direction of the vehicle body 12. A direction UP is an upward direction of a vertical direction of the vehicle body 12. A direction DW is a downward direction of the vertical direction of the vehicle body 12. The fore-and-aft direction of the vehicle body 12, the width direction of the vehicle body 12, and the vertical direction of the vehicle body 12, may herein be referred to simply as "fore-and-aft direction", "width direction", and "vertical direction", respectively.

The vehicle 10 will be described with reference to FIGS. 1 to 6. As illustrated in FIG. 1, the vehicle 10 includes the vehicle body 12 and the back door 14. Although there is no particular limitation, the vehicle body 12 is made of steel, an aluminum alloy, or the like. At the rear of the vehicle body 12, the vehicle body 12 has a luggage space 12a and a back door opening 12b open toward the rear. The back door 14 is a movable member for opening or closing the back door opening 12b.

Door Panel

As illustrated in FIGS. 2A to 2C, the back door 14 includes a door panel 20. The door panel 20 includes an inner panel 22 arranged on an inner side of the vehicle body 12 (on the luggage space 12a side), and an outer panel 24 arranged on an outer side of the vehicle body 12. The inner panel 22 and the outer panel 24 each have a substantially rectangular outer periphery including an upper edge 26, side edges 28a and 28b, and a lower edge 30. An inner peripheral edge including the upper edges 26, the side edges 28a and 28b, and the lower edges 30 of the inner panel 22 and the outer panel 24 defines an open edge 32 for attaching a back window glass 40.

The facing edges of the inner panel 22 and the outer panel 24 are joined by welding or the like as appropriate to form a closed sectional space on the substantially entire inner side where the inner panel 22 and the outer panel 24 face each other, thereby imparting rigidity to the entire door panel 20. In the embodiment illustrated in FIGS. 2A to 2C, central portions of the upper edges 26 of the inner panel 22 and the outer panel 24 in the width direction are recessed upward in the vertical direction to attach a high-mount stop lamp 80. Therefore, at the attachment position of the high-mount stop lamp 80, the sectional area of the closed sectional space is minimum on the upper edges 26.

Back Window Glass

Although there is no particular limitation, the back door 14 has the back window glass 40 attached to the open edge 32 with, for example, an adhesive. The back window glass 40 is attached to the outer panel 24 on the outer side of the vehicle body. The back window glass 40 is attached to reach an upper edge and a lower edge of the open edge 32 of the door panel 20 and cover the substantially entire widths of the side edges 28a and 28b.

Although illustration is omitted, the parts of the attached back window glass 40 on the upper edge 26, the side edges 28a and 28b, and the lower edge 30 of the door panel 20 are covered with a resin exterior panel, sealing, or the like.

Hinges

As illustrated in FIGS. 2A to 2C and FIG. 3, the back door 14 is attached to the vehicle body 12 by a pair of right and left hinges 50. In the back door 14, the hinges 50 are attached to the upper edge 26 of the door panel 20. The hinges 50 turnably couple the back door 14 to an upper part of the vehicle body 12.

As illustrated in FIG. 4, the hinge 50 includes a hinge attachment 52 and a hinge arm 54. The hinge attachment 52 is fixed to a predetermined portion in the vicinity of the back door opening 12b of the vehicle body 12. Although there is no particular limitation, the hinge arm 54 is a plate-shaped body having a predetermined width and a cross section in the width direction. The hinge arm 54 turns with the hinge attachment 52 as a base.

The inner panel 22 includes a hinge support 56 that fastens and supports the turning end of the hinge arm 54. In the hinge support 56, the end (turning end) of the hinge arm 54 opposite to the hinge attachment 52 is fastened to the back surface of the inner panel 22 with bolts 55. The hinge support 56 is formed at a predetermined position on an upper side of the upper edge 26 of the inner panel 22 in the vertical direction and on an outer side in the width direction.

Hinge Reinforcing Members

As illustrated in FIGS. 2A to 2C and FIG. 3, the inner panel 22 includes a hinge reinforcing member 60 at a corner 27 between the upper edge 26 and each of the side edges 28a and 28b. The hinge reinforcing member 60 is a substantially plate-shaped body that covers the substantially entire corner 27 of the inner panel 22 including the hinge support 56 of the inner panel 22 and fits within the inner panel 22. More specifically, the hinge reinforcing member 60 extends downward in the vertical direction (downward arrow C in FIG. 3) to the upper edge of the open edge 32 of the inner panel 22 beyond an upper edge 42 of the attached back window glass 40, including the hinge support 56 (corresponding portion on the front surface because the hinge support 56 is located on the back surface of the inner panel 22). The hinge reinforcing member 60 extends outward in the width direction (rightward arrow D in FIG. 3) to a part in the vicinity of and short of the outer peripheral edge of the side edge 28b of the inner panel 22. The hinge reinforcing member 60 includes an inner edge 64 along a corner 32a of the open edge 32 of the inner panel 22. The hinge reinforcing member 60 is an example of a first reinforcing member disclosed herein.

As illustrated in FIG. 4, the hinge reinforcing member 60 is a plate-shaped body having a predetermined shape bent as appropriate. The hinge reinforcing member 60 is fixed with the bolts 55 that fasten the hinge arm 54 at the hinge support 56 of the inner panel 22. An edge of the hinge reinforcing member 60 along the outer peripheral edge of the upper edge 26 of the inner panel 22 is joined to a front surface of the inner panel 22.

The inner edge 64 of the hinge reinforcing member 60 is joined to the inner panel 22 and the outer panel 24 by spot welding at the open edge 32. That is, the inner edge 64 of the hinge reinforcing member 60 is spot-welded at an inner bending point W1 of the corner 32a of the open edge 32 of each of the inner panel 22 and the outer panel 24 and at both sides of the inner bending point W1, that is, a point W2 on the upper edge 26 along the open edge 32 and a point W3 on the side edge 28b along the open edge 32.

The outer peripheral edges of the upper edge 26, the corner 27, and the side edge 28b (or 28a) of the door panel 20 having the hinge reinforcing member 60 inside are joined to each other by welding.

Figure 5B:
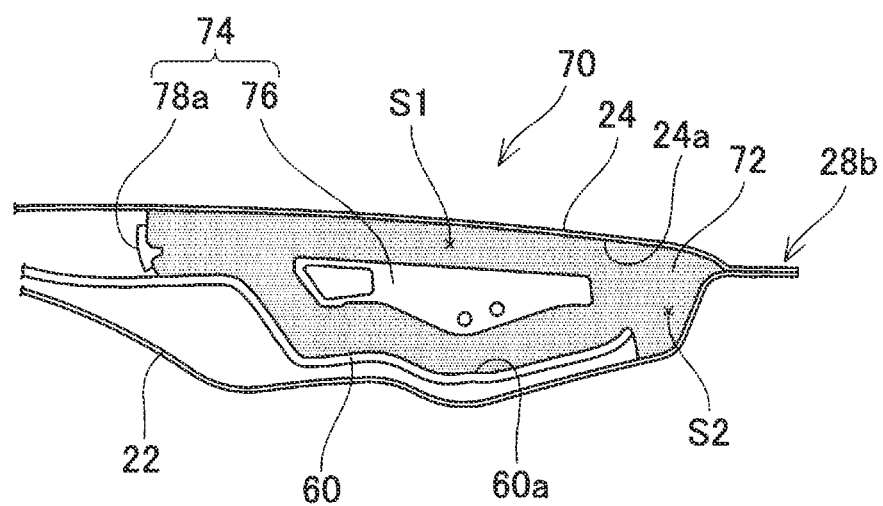
FIG. 5B is a sectional view taken along a line VB-VB in FIG. 5A.

As illustrated in FIGS. 4 and 5B, the hinge reinforcing member 60 defines a sectional space S1 as a part of the closed sectional space defined by the outer panel 24 between a front surface 60a of the hinge reinforcing member 60 and an inner surface 24a of the outer panel 24 on the inner side of the vehicle body. By providing the sectional space S1, a range from the hinge support 56 to the side edge 28b of the door panel 20 is reinforced. The sectional space S1 is an example of a first space disclosed herein.

FIG. 5B illustrates a state in the vicinity of a porous reinforcing member 70 of the hinge reinforcing member 60. As illustrated in FIG. 5B, in the sectional space S1, a space on an outer side in the width direction from the hinge support 56 is larger in the sectional area than a space closer to the center in the width direction from the hinge support 56. In the vicinity of the porous reinforcing member 70, a sectional space S2 is provided on an outer side in the width direction from an outer edge 62 of the hinge reinforcing member 60. The sectional space S2 is provided between the front surface of the inner panel 22 and the inner surface 24a of the outer panel 24 in the vicinity of a joint portion between the inner panel 22 and the outer panel 24. The sectional space S2 is an example of a second space disclosed herein.

Porous Reinforcing Member

As illustrated in FIGS. 3 to 5B, the porous reinforcing member 70 is provided at a part of the sectional space S1 between the hinge reinforcing member 60 and the outer panel 24. The porous reinforcing member 70 includes a porous portion 72 to exhibit a high rigidity. The term "porous" refers to a state of a matrix having a large number of open cells and/or closed cells randomly distributed three-dimensionally as a whole. The term "porous portion" refers to a portion including such a matrix. The term "non-porous" refers to a state of a substantially solid matrix without such cells. The term "non-porous portion" refers to a portion including such a matrix.

As illustrated in FIGS. 2A to 6, the porous reinforcing member 70 has an elongated shape extending in the width direction as a whole when the door panel 20 is viewed from the rear in the fore-and-aft direction. As illustrated in FIG. 5B, the porous reinforcing member 70 includes the porous portion 72 and a non-porous portion 74.

As illustrated in FIG. 5B, the porous portion 72 is a major component of the porous reinforcing member 70. The porous portion 72 is made of polypropylene foam that is foamed by heating. As the foam, a known foam material capable of exhibiting a high rigidity can be used as appropriate. Although there is no particular limitation, examples of the foam include foamed rubbers and foamed plastics, in particular, a hard polyurethane foam, a polystyrene foam, a polyethylene foam, a polypropylene foam, an ethylene-vinyl acetate (EVA) crosslinked foam, a polyethylene terephthalate (PET) resin foam, a phenol foam, a silicone foam, a polyvinyl chloride foam, a urea foam, an acrylic foam, a polyimide foam, and an ethylene propylene diene monomer (EPDM) foam.

The non-porous portion 74 includes a core 76 and outer frames 78a, 78b, and 78c. These components support the porous portion 72 before and after foaming. The core 76 is held while being enclosed in the porous portion 72. The core 76 can not only serve as the support but also contribute to improvement in the rigidity of the porous reinforcing member 70.

The outer frames 78a and 78b serve as edges of the porous reinforcing member 70 closer to the center in the width direction and on the lower side in the vertical direction. The outer frame 78c serves as an upper edge of the porous reinforcing member 70. An outer side of the porous reinforcing member 70 in the width direction has no outer frame.

The outer frames 78a, 78b, and 78c attach and hold the porous portion 72 before foaming at a predetermined position. These outer frames also function as walls that regulate foaming as typified by a foaming shape. These outer frames can contribute to the improvement in the rigidity of the porous reinforcing member 70. The outer frames 78a and 78b are provided so that the porous portion 72 does not interfere with the back window glass 40 or the like. The outer frame 78c is provided so that the porous portion 72 does not interfere with attachment of other elements. Since the porous reinforcing member 70 has no outer frame on the outer side in the width direction, a foamable material 71 is foamed to expand outward in the width direction, and reaches the joint portion between the inner panel 22 and the outer panel 24.

The material of the non-porous portion 74 is not particularly limited, but for example, a metal, a ceramic, and a plastic may be used as appropriate. Examples of the plastic include an epoxy resin and a urethane resin.

The shape of the porous reinforcing member 70 and its width over the upper edge 42 are not particularly limited, and are set as appropriate depending on shapes of surrounding elements, the rigidity of the porous reinforcing member 70, and a required rigidity.

As illustrated in FIG. 3, the porous reinforcing member 70 is arranged over a line connecting the inner bending point W1 of the corner 32a of the open edge 32 of the door panel 20 and an outer bending point W4 of the corner 27. More specifically, a part of the porous reinforcing member 70 closer to the center in the width direction is arranged on the line. The porous reinforcing member 70 is arranged beyond the outer edge 62 of the hinge reinforcing member 60 on the outer side in the width direction.

As illustrated in FIGS. 4 to 5B, the porous reinforcing member 70 fills a sectional space between the hinge reinforcing member 60 and the outer panel 24 on the outer side in the width direction from the hinge support 56 in the sectional space S1. The porous reinforcing member 70 continuously laps immediately under the upper edge 42 of the back window glass 40 attached to the upper surface of the outer panel 24.

In particular, as illustrated in FIGS. 4 and 5B, the porous reinforcing member 70 fills, without a gap in the vertical direction, a sectional space between the outer panel 24 and the hinge reinforcing member 60 immediately under the upper edge 42 of the back window glass 40 in the sectional space S1. The porous reinforcing member 70 is joined to the front surface 60a of the hinge reinforcing member 60 and the inner surface 24a of the outer panel 24. In this sectional space, the cross section of the door panel 20 is defined by the inner panel 22, the hinge reinforcing member 60, the porous portion 72 and the non-porous portion 74 of the porous reinforcing member 70, and the outer panel 24.

The porous reinforcing member 70 reaches the joint portion between the outer panel 24 and the inner panel 22 beyond the outer edge 62 of the hinge reinforcing member 60. That is, the porous reinforcing member 70 extends to the sectional space S2 in the vicinity of the joint between the outer peripheral edges of the inner panel 22 and the outer panel 24, and is also joined to the inner surfaces of the inner panel 22 and the outer panel 24 by filling the sectional space S2. In the sectional space S2, the porous reinforcing member 70 extends beyond the outer edge of the hinge reinforcing member 60. In the sectional space S2, the cross section of the door panel 20 is defined by the inner panel 22, the porous portion 72 of the porous reinforcing member 70, and the outer panel 24.

Figure 6:
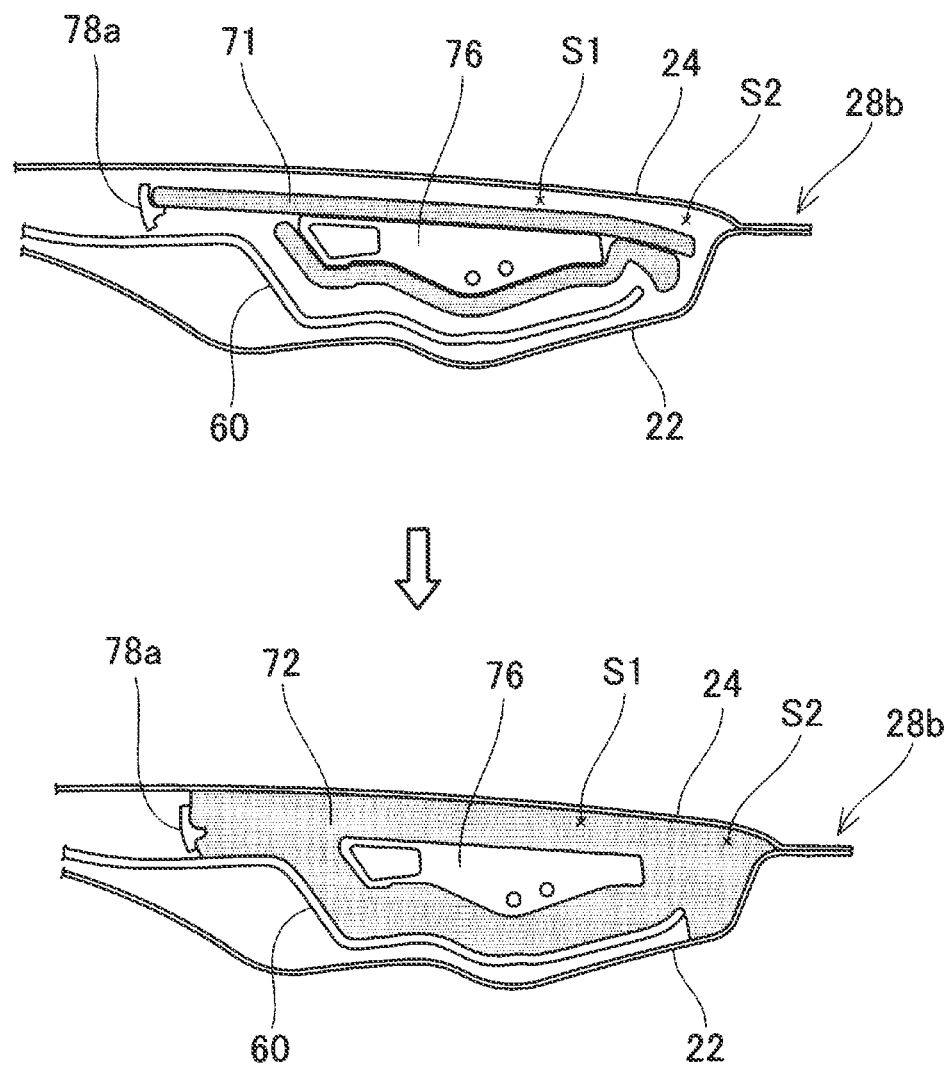
FIG. 6 is a diagram illustrating states before and after foaming of the porous reinforcing member.

As illustrated in FIG. 6, the porous reinforcing member 70 is integrated with the door panel 20 by in-situ foaming. That is, the porous reinforcing member 70 is attached to the hinge reinforcing member 60 laid on the inner panel 22 in the state before foaming, and is heated at least after the outer panel 24 is attached. As a result, the foamable material 71 is foamed to finally form the porous portion 72, and fills the sectional space S1 and the sectional space S2 within a predetermined range along the upper edge 42 of the glass.

First, the porous reinforcing member 70 is attached to the hinge reinforcing member 60 laid on the inner panel 22 within a predetermined range of the upper edge 42 of the back window glass 40 to be attached. After the outer panel 24 is attached, the foamable material 71 is foamed by heating a portion where the door panel 20 or the porous reinforcing member 70 is arranged during or after the assembling of the back door 14.

Through the foaming, the porous portion 72 fills a range from a part of the upper edge 42 of the back window glass 40 on the outer side of the hinge support 56 to the joint portion between the outer peripheral edges of the inner panel 22 and the outer panel 24 beyond the outer edge 62 of the hinge reinforcing member 60, and is joined to the inner surfaces of the inner panel 22 and the outer panel 24. Through the foaming, the porous portion 72 fills the space between the front surface 60a of the hinge reinforcing member 60 and the inner surface 24a of the outer panel 24, and is joined to those surfaces.

The parts of the porous reinforcing member 70 closer to the center and along the upper edge and the lower end are regulated by the outer frames 78a, 78b, and 78c, thereby preventing interference with other elements such as the back window glass 40. With those outer frames 78, the porous portion 72 securely fills the space between the front surface 60a of the hinge reinforcing member 60 and the inner surface 24a of the outer panel 24, and is joined to those surfaces.

According to the embodiment described above, the hinge reinforcing member 60 is provided at the corner 27 of the door panel 20, and the porous reinforcing member 70 is provided in the sectional space S1 on the outer side of the hinge support 56 to overlap the upper edge 42 of the back window glass 40. As a result, it is possible to impart rigidity to resist bending deformation at the corner 27 of the door panel 20, in particular, on the outer side of the hinge support 56. It is also possible to impart rigidity to resist bending deformation at the upper edge 42 of the back window glass 40.

According to the embodiment described above, it is possible to easily provide the door panel structure in which even the back window glass 40 having a large area, a large mass, or a gentle inclination can be attached. With this structure, it is possible to reduce the sectional area of a closed sectional space of the door panel.

Since the porous reinforcing member 70 mainly includes the porous portion 72 and is made of the resin material, the door panel 20 can be reinforced without significantly increasing the vehicle mass.

In the embodiment described above, the porous reinforcing member 70 has the special filling and joining structures between the porous reinforcing member 70 and each of the hinge reinforcing member 60, the outer panel 24, and the inner panel 22 in the sectional space S1 and the sectional space S2 of the door panel 20 of the back door 14. That is, the porous reinforcing member 70 fills the space between the front surface 60a of the hinge reinforcing member 60 and the inner surface 24a of the outer panel 24 in the vertical direction along the upper edge 42 of the glass on the outer side of the hinge support 56 in the sectional space S1, and is joined to those surfaces. On the outer side in the width direction, the porous reinforcing member 70 fills the space between the inner surfaces of the inner panel 22 and the outer panel 24 at the joint portion between the outer peripheral edges beyond the hinge reinforcing member 60, and is joined to those inner surfaces. Therefore, the door panel 20, the hinge reinforcing member 60, and the porous reinforcing member 70 can firmly be integrated at the corner 27, thereby securely attaining a high rigidity at the portion where the high rigidity is required.

In the embodiment described above, the porous reinforcing member 70 is integrated with the sectional space by the in-situ foaming caused by heating the porous reinforcing member 70 before foaming. Therefore, a firm joint structure can be obtained easily and surely.

In the embodiment described above, the sectional area of the sectional space S1 on the outer side in the width direction from the hinge support 56 is larger than the sectional area of the sectional space S1 closer to the center in the width direction. As a result, the rigidity of the corner 27 can be improved effectively.

In the embodiment described above, the porous reinforcing member 70 includes the core 76 and the outer frames 78a, 78b, and 78c. Therefore, the rigidity of the corner 27 can securely be improved by arranging the porous reinforcing member 70 before foaming securely at an intended position and regulating the foaming. The core 76 and the outer frames 78a, 78b, and 78c may contribute to the improvement in the rigidity. The outer frames 78a, 78b, and 78c can suppress interference between the porous portion 72 and other elements.

In the embodiment described above, the part of the porous reinforcing member 70 closer to the center in the width direction is arranged on the line connecting the inner bending point W1 of the corner 32a of the open edge 32 of the door panel 20 and the outer bending point W4 of the corner 27. Therefore, it is possible to effectively reinforce the corner 32a of the open edge 32 where stress is likely to concentrate.

In the embodiment described above, the inner edge 64 of the hinge reinforcing member 60 is spot-welded at the inner bending point W1 of the corner 32a of the open edge 32 of each of the inner panel 22 and the outer panel 24 and at both sides of the inner bending point W1, that is, the point W2 on the upper edge 26 and the point W3 on the side edge 28b. Therefore, it is possible to effectively reinforce the corner 32a of the open edge 32 where stress is likely to concentrate. It is possible to effectively improve the rigidity to resist torsional deformation at the corner 32a. In combination with the arrangement of the porous reinforcing member 70 on the line connecting the inner bending point W1 and the outer bending point W4 of the door panel 20, a further effect is attained to improve the rigidity against the torsional deformation.

In the embodiment described above, the sectional area of the closed sectional space is minimum on the upper edge 26 to define the attachment position of the high-mount stop lamp 80. In the embodiment described above, the corner 27 is reinforced and the rigidity is improved even though the sectional area of the closed sectional space is minimum at the attachment position of the high-mount stop lamp 80. Therefore, the back window glass 40 having a large mass can be attached.

The embodiment described above discloses not only the vehicle including the back door 14, but also the back door 14 attached to the rear of the vehicle body, and the back door 14 before the back window glass 40 is attached. The embodiment described above also discloses the method for improving the rigidity of the back door, and the method for manufacturing the back door with the improved rigidity.

In the embodiment described above, the side edge 28b of the door panel 20 has been described mainly, but the right and left hinge reinforcing members 60 may have the porous reinforcing members 70, respectively, or only the side edge 28a may have the porous reinforcing member 70. The structure is not limited to those structures. At least one of those components may have such a reinforcing structure.

In the embodiment described above, the three members that are the inner panel 22, the hinge reinforcing member 60, and the outer panel 24, that is, the panel of the open edge 32 at the corner 27, the first reinforcing member, and the outer panel are joined at three points on the corner 32a of the open edge 32 of the door panel 20, but the structure is not limited to this joining structure. Any one of the points may be provided. For example, the three members may be spot-welded only at the inner bending point W1. The three members may be spot-joined at any one point. For example, at the points other than the one point, two out of the three members such as the inner panel 22 and the hinge reinforcing member 60 or the outer panel 24 and the hinge reinforcing member 60 may be spot-joined.

In the embodiment described above, the part of the porous reinforcing member 70 intersects the line connecting the inner bending point W1 and the outer bending point W4 of the corner 27, but the structure is not limited to this structure. Even if the porous reinforcing member 70 is not arranged on the line, the rigidity against the bending deformation at the upper edge 42 of the back window glass 40 and on the outer side of the hinge support 56 can be improved.

In the embodiment described above, the porous reinforcing member 70 is provided continuously on the outer side of the hinge support 56 in the sectional space S1 and in the sectional space S2 to extend to the joint portion between the outer peripheral edges of the door panel 20 over the substantially entire upper edge 42 of the back window glass 40, but the structure is not limited to this structure. The closed sectional space S3 may be filled at least at a part of the upper edge 42. The closed sectional space S3 may also be filled at one or more locations along the upper edge 42. Also in this case, the rigidity to resist the bending deformation and the torsional deformation in the vicinity of the upper edge 42 and on the outer side of the hinge support 56 may be improved.

In the embodiment described above, the porous reinforcing member 70 includes the porous portion 72 and the non-porous core 76 to overlap the upper edge 42 of the glass at the part of the sectional space S1, but the porous reinforcing member 70 is not limited to this structure. Even if the non-porous core 76 is not provided, the rigidity can be improved by the porous portion 72. The porous reinforcing member 70 includes the outer frames 78*a*, 78*b*, and 78*c*, but is not limited to this structure. The structure is set as appropriate depending on the necessity of regulation of foaming.

In the embodiment described above, the porous reinforcing member 70 is arranged by the in-situ foaming, but is not limited to this arrangement. The porous reinforcing member 70 having an appropriate rigidity may be arranged by using an adhesive or the like as necessary.

Although the specific examples of the technology disclosed herein are described in detail above, the examples are only illustrative and are not intended to limit the scope of the claims. The technology described in the claims includes various modifications and alterations of the specific examples described above. The technical elements described herein or illustrated in the drawings exhibit technical utility solely or in various combinations, and are not limited to the combination described in the claims as filed. The technologies described herein or illustrated in the drawings may simultaneously achieve a plurality of objects, and exhibit technical utility by achieving one of the objects.

What is claimed is:

1. A vehicle comprising:
    a vehicle body; and
    a back door attached to a rear of the vehicle body, the back door including:
        a back window glass;
        a door panel including an inner panel arranged on an inner side of the vehicle body, and an outer panel arranged on an outer side of the vehicle body with the back window glass attached to the outer panel, the inner panel and the outer panel each including an upper edge, side edges, and a lower edge to define an open edge where the back window glass is attached;
        a hinge fixed to the upper edge of the inner panel and turnably connecting the back door to the vehicle body;
        a first reinforcing member laid on the inner panel on the outer side of the vehicle body and fixed to the inner panel together with the hinge, the first reinforcing member having a shape extending downward in a vertical direction of the vehicle body within a range from a hinge support that supports the hinge fixed to the inner panel to a portion overlapping a glass upper edge of the back window glass, and extending outward in a width direction of the vehicle body within a range from the hinge support to the side edge; and
        a second reinforcing member including a porous portion and arranged to fill a first space between the first reinforcing member and the outer panel on an outer side in the width direction of the vehicle body from the hinge support to overlap at least a part of the glass upper edge, the second reinforcing member includes a non-porous portion in addition to the porous portion to overlap at least the part of the glass upper edge.

2. The vehicle according to claim 1, wherein the second reinforcing member is arranged to intersect a line passing through an inner bending point and an outer bending point of a corner between the upper edge and the side edge of the door panel.

3. The vehicle according to claim 1, wherein the inner panel, the first reinforcing member, and the outer panel have at least one joint point on an inner edge of a corner between the upper edge and the side edge of the door panel, including an inner bending point of the corner.

4. The vehicle according to claim 1, wherein the second reinforcing member is arranged to further fill a second space between the inner panel and the outer panel in a vicinity of a joint portion between the inner panel and the outer panel on the outer side in the width direction of the vehicle body to overlap the glass upper edge.

5. The vehicle according to claim 1, wherein the second reinforcing member is arranged to continuously fill a range from the outer side in the width direction of the vehicle body from the hinge support to a joint portion between the inner panel and the outer panel on the outer side in the width direction of the vehicle body to overlap the glass upper edge.

6. The vehicle according to claim 1, wherein the second reinforcing member is joined to a surface of the first reinforcing member on the outer side of the vehicle body and a surface of the outer panel on the inner side of the vehicle body.

7. The vehicle according to claim 1, wherein the second reinforcing member is joined to inner peripheral surfaces in a vicinity of a joint portion between the inner panel and the outer panel on the outer side in the width direction of the vehicle body.

8. The vehicle according to claim 1, wherein the second reinforcing member is produced by in-situ foaming and integrated with the door panel.

9. The vehicle according to claim 1, wherein a sectional area of a closed sectional space on the upper edges of the inner panel and the outer panel is minimum at a central portion in the width direction of the vehicle body.

10. A back door to be attached to a rear of a vehicle body, the back door comprising:
    a door panel including an inner panel arranged on an inner side of the vehicle body, and an outer panel arranged on an outer side of the vehicle body with a back window glass attached to the outer panel, the inner panel and the outer panel each including an upper edge, side edges, and a lower edge to define an open edge where the back window glass is attached;

a hinge fixed to the upper edge of the inner panel and turnably connecting the back door to the vehicle body;

a first reinforcing member laid on the inner panel on the outer side of the vehicle body and fixed to the inner panel together with the hinge, the first reinforcing member having a shape extending downward in a vertical direction of the vehicle body within a range from a hinge support that supports the hinge fixed to the inner panel to a portion overlapping a glass upper edge of the back window glass, and extending outward in a width direction of the vehicle body within a range from the hinge support to the side edge; and a second reinforcing member including a porous portion and arranged to fill a space between the first reinforcing member and the outer panel on an outer side in the width direction of the vehicle body from the hinge support to overlap at least a part of the glass upper edge, the second reinforcing member includes a non-porous portion in addition to the porous portion to overlap at least the part of the glass upper edge.

11. The back door according to claim 10, wherein the back window glass is attached to the open edge.

\* \* \* \* \*